United States Patent
Nichols

(10) Patent No.: US 8,079,032 B2
(45) Date of Patent: Dec. 13, 2011

(54) METHOD AND SYSTEM FOR RENDERING HARMLESS A LOCKED PESTWARE EXECUTABLE OBJECT

(75) Inventor: Tony Nichols, Erie, CO (US)

(73) Assignee: Webroot Software, Inc., Broomfield, CO (US)

( * ) Notice: Subject to any disclaimer, the term of this patent is extended or adjusted under 35 U.S.C. 154(b) by 1545 days.

(21) Appl. No.: 11/386,590

(22) Filed: Mar. 22, 2006

(65) Prior Publication Data

US 2007/0226704 A1   Sep. 27, 2007

(51) Int. Cl.
*G06F 9/46* (2006.01)
*G06F 11/00* (2006.01)
*G06F 12/14* (2006.01)
*G06F 12/16* (2006.01)
*G08B 23/00* (2006.01)

(52) U.S. Cl. .......................... 718/100; 726/22
(58) Field of Classification Search .................... 726/24; 718/100
See application file for complete search history.

(56) References Cited

U.S. PATENT DOCUMENTS

| | | |
|---|---|---|
| 5,537,540 A | 7/1996 | Miller |
| 5,623,600 A | 4/1997 | Ji et al. |
| 5,684,875 A | 11/1997 | Ellenberger |
| 5,920,696 A | 7/1999 | Brandt et al. |
| 5,951,698 A | 9/1999 | Chen et al. |
| 6,069,628 A | 5/2000 | Farry et al. |
| 6,073,241 A | 6/2000 | Rosenberg et al. |
| 6,092,194 A | 7/2000 | Touboul |
| 6,154,844 A | 11/2000 | Touboul |
| 6,167,520 A | 12/2000 | Touboul |
| 6,310,630 B1 | 10/2001 | Kulkarni et al. |
| 6,347,375 B1 | 2/2002 | Reinert |
| 6,397,264 B1 | 5/2002 | Stasnick et al. |
| 6,405,316 B1 | 6/2002 | Krishnan et al. |
| 6,460,060 B1 | 10/2002 | Maddalozzo, Jr. et al. |
| 6,480,962 B1 | 11/2002 | Touboul |
| 6,535,931 B1 | 3/2003 | Celi, Jr. |
| 6,611,878 B2 | 8/2003 | De Armas et al. |
| 6,633,835 B1 | 10/2003 | Moran et al. |
| 6,667,751 B1 | 12/2003 | Wynn et al. |

(Continued)

FOREIGN PATENT DOCUMENTS

WO    WO 93/25024 A    12/1993

(Continued)

OTHER PUBLICATIONS

Bontchev, V.; *Possible Virus Attacks Against Integrity Programs and How to Prevent Them*; Virus Bulletin Conference, Virus Bulletin LTd., Abington, GB; Sep. 2, 1992; pp. 131-142, XP000613974; paragraph [02.1].

(Continued)

*Primary Examiner* — Meng An
*Assistant Examiner* — Eric Wai
(74) *Attorney, Agent, or Firm* — Cooley LLP

(57) ABSTRACT

A method and system for rendering harmless a locked pestware executable object is described. In one illustrative embodiment, a locked pestware executable object is detected on a storage device of a computer, the locked pestware executable object being inaccessible via the computer's operating system; the locked pestware executable object is accessed through direct drive access; and data in the locked pestware executable object is modified in a manner that renders it harmless to the computer.

8 Claims, 7 Drawing Sheets

U.S. PATENT DOCUMENTS

| | | |
|---|---|---|
| 6,701,441 B1 | 3/2004 | Balasubramaniam et al. |
| 6,772,345 B1 | 8/2004 | Shetty |
| 6,785,732 B1 | 8/2004 | Bates et al. |
| 6,804,780 B1 | 10/2004 | Touboul |
| 6,813,711 B1 | 11/2004 | Dimenstein |
| 6,829,654 B1 | 12/2004 | Jungek |
| 6,910,134 B1 | 6/2005 | Maher et al. |
| 6,965,968 B1 | 11/2005 | Touboul |
| 7,058,822 B2 | 6/2006 | Edery et al. |
| 7,107,617 B2 | 9/2006 | Hursey et al. |
| 7,603,440 B1 * | 10/2009 | Grabowski et al. ........... 709/220 |
| 2002/0162015 A1 | 10/2002 | Tang |
| 2002/0166063 A1 | 11/2002 | Lachman et al. |
| 2003/0065943 A1 | 4/2003 | Geis et al. |
| 2003/0074581 A1 | 4/2003 | Hursey et al. |
| 2003/0101381 A1 | 5/2003 | Mateev et al. |
| 2003/0159070 A1 | 8/2003 | Mayer et al. |
| 2003/0217287 A1 | 11/2003 | Kruglenko |
| 2004/0030914 A1 | 2/2004 | Kelley et al. |
| 2004/0034794 A1 | 2/2004 | Mayer et al. |
| 2004/0064736 A1 | 4/2004 | Obrecht et al. |
| 2004/0080529 A1 | 4/2004 | Wojcik |
| 2004/0143763 A1 | 7/2004 | Radatti |
| 2004/0187023 A1 | 9/2004 | Alagna et al. |
| 2004/0225877 A1 | 11/2004 | Huang |
| 2005/0038697 A1 | 2/2005 | Aaron |
| 2005/0138433 A1 | 6/2005 | Linetsky |
| 2005/0154885 A1 | 7/2005 | Viscomi et al. |
| 2006/0074896 A1 | 4/2006 | Thomas |
| 2006/0075494 A1 | 4/2006 | Bertman et al. |
| 2006/0075501 A1 | 4/2006 | Thomas et al. |
| 2006/0085528 A1 * | 4/2006 | Thomas ........................ 709/223 |
| 2006/0161988 A1 | 7/2006 | Costea et al. |
| 2006/0272021 A1 * | 11/2006 | Marinescu et al. .............. 726/24 |
| 2006/0294590 A1 * | 12/2006 | Enstone et al. .................. 726/24 |

FOREIGN PATENT DOCUMENTS

| | | |
|---|---|---|
| WO | WO 02/084482 A1 | 10/2002 |
| WO | PCT/US2006/041798 | 12/2007 |

OTHER PUBLICATIONS

Yi-Min Wang et al.; *Detecting Stealth Software with Strider GhostBuster*; Dependable Systems and Networks, 2005. DSN 2005. Proceedings. International Conference on Yokohama, Japan Jun. 1-28, 2005, Piscataway, NJ, USA, IEEE, Jun. 28, 2005, pp. 368-377, XP010817813; ISBN: 0-7695-2282-3; paragraph [0002].

International Search Report and Written Opinion dated Sep. 27, 2007 for PCT/US2007/064489.

U.S. Appl. No. 10/956,578, filed Oct. 1, 2004, Steve Thomas.
U.S. Appl. No. 11/145,593, filed Jun. 6, 2005, Tony Nichols et al.
U.S. Appl. No. 11/145,592, filed Jun. 6, 2005, Tony Nichols et al.
U.S. Appl. No. 11/454,097, filed Jun. 15, 2006, Troy A. Carpenter et al.

Codeguru, Three Ways to Inject Your Code Into Another Process, by Robert Kuster, Aug. 4, 2003, 22 pgs.

Codeguru, Managing Low-Level Keyboard Hooks With the Windows API for VB .Net, by Paul Kimmel, Apr. 18, 2004, 10 pgs.

Codeguru, Hooking The Keyboard, by Anoop Thomas, Dec. 13, 2001, 6 pgs.

Illusive Security, Wolves In Sheep's Clothing: Malicious DLLs Injected Into trusted Host Applications, Author Unknown, home.arcor.de/scheinsicherheit/dll.htm 13 pgs., Aug. 10, 2003.

DevX.com, Intercepting Systems API Calls, by Seung-Woo Kim, May 13, 2004, 6 pgs.

Microsoft.com, How to Subclass A Window in Windows 95, Article ID 125680, Jul. 11, 2005, 2 pgs.

MSDN, Win32 Hooks by Kyle Marsh, Jul. 29, 1993, 15 pgs.

PCT Search Report, PCT/US05/34874, Jul. 5, 2006, 7 Pages.

Yurcik, William et al., A Planning Framework for Implementing Virtual Private Networks, Jun. 2001, IT Pro, IEEE, pp. 41-44.

\* cited by examiner

METHOD AND SYSTEM FOR RENDERING HARMLESS A LOCKED PESTWARE EXECUTABLE OBJECT

RELATED APPLICATIONS

The present application is related to commonly owned and assigned U.S. application Ser. No. 11/145,593, "System and Method for Neutralizing Locked Pestware Files," filed on Jun. 6, 2005, which is incorporated herein by reference in its entirety.

FIELD OF THE INVENTION

The present invention relates generally to protecting computers from pestware or malware. More specifically, but without limitation, the invention relates to methods and systems for rendering harmless a pestware or malware executable object that is inaccessible via the operating system of the computer.

BACKGROUND OF THE INVENTION

Protecting personal computers against a never-ending onslaught of "pestware" such as viruses, Trojan horses, spyware, adware, and downloaders on personal computers has become vitally important to computer users. Some pestware is merely annoying to the user or degrades system performance. Other pestware is highly malicious. Many computer users depend on anti-pestware software that attempts to detect and remove pestware automatically.

Anti-pestware software typically scans running processes in memory and files contained on storage devices such as disk drives, comparing them, at expected locations, against a set of "signatures" that identify specific, known types of pestware.

In some cases, a pestware process, after initially starting up, reopens itself with an exclusive-lock flag that prevents access of any kind, via the computer's operating system, to a disk file (executable object) containing the pestware's program code. Such a pestware executable object may be said to be "locked." Such pestware can also prevent its executing process in memory from being terminated by anti-pestware software. Furthermore, the pestware may also employ a "rootkit" to conceal itself from the computer's file-system directory, a task manager that displays running processes, or a registry of the operating system. Often, such pestware also obscures its presence by using nondescript file names such as "1.exe". Current anti-pestware software, even if it succeeds in detecting a locked pestware executable object, is not always able to neutralize or delete it.

It is thus apparent that there is a need in the art for an improved method and system for rendering harmless a locked pestware executable object.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a method and system for rendering harmless a locked pestware executable object. One illustrative embodiment is a method comprising detecting a locked pestware executable object on a storage device of a computer, the locked pestware executable object being inaccessible via an operating system of the computer; accessing the locked pestware executable object through direct drive access, the direct drive access bypassing standard file Application-Program-Interface (API) function calls of the operating system; and modifying data in the locked pestware executable object in a manner that renders it harmless to the computer.

Another illustrative embodiment is a system comprising a detection module configured to detect a locked pestware executable object on a storage device of a computer, the locked pestware executable object being inaccessible via an operating system of the computer; a direct-access module configured to access the locked pestware executable object through direct drive access, the direct drive access bypassing standard file API function calls of the operating system; and a neutralization module configured to modify data in the locked pestware executable object in a manner that renders the locked pestware executable object harmless to the computer.

Yet another illustrative embodiment is a computer-readable storage medium containing program instructions comprising a first instruction segment configured to detect a locked pestware executable object on a storage medium of a computer, the locked pestware executable object being inaccessible via an operating system of the computer; a second instruction segment configured to access the locked pestware executable object through direct drive access, the direct drive access bypassing standard file API function calls of the operating system; and a third instruction segment configured to modify data in the locked pestware executable object in a manner that renders the locked pestware executable object harmless to the computer. These and other embodiments are described in more detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
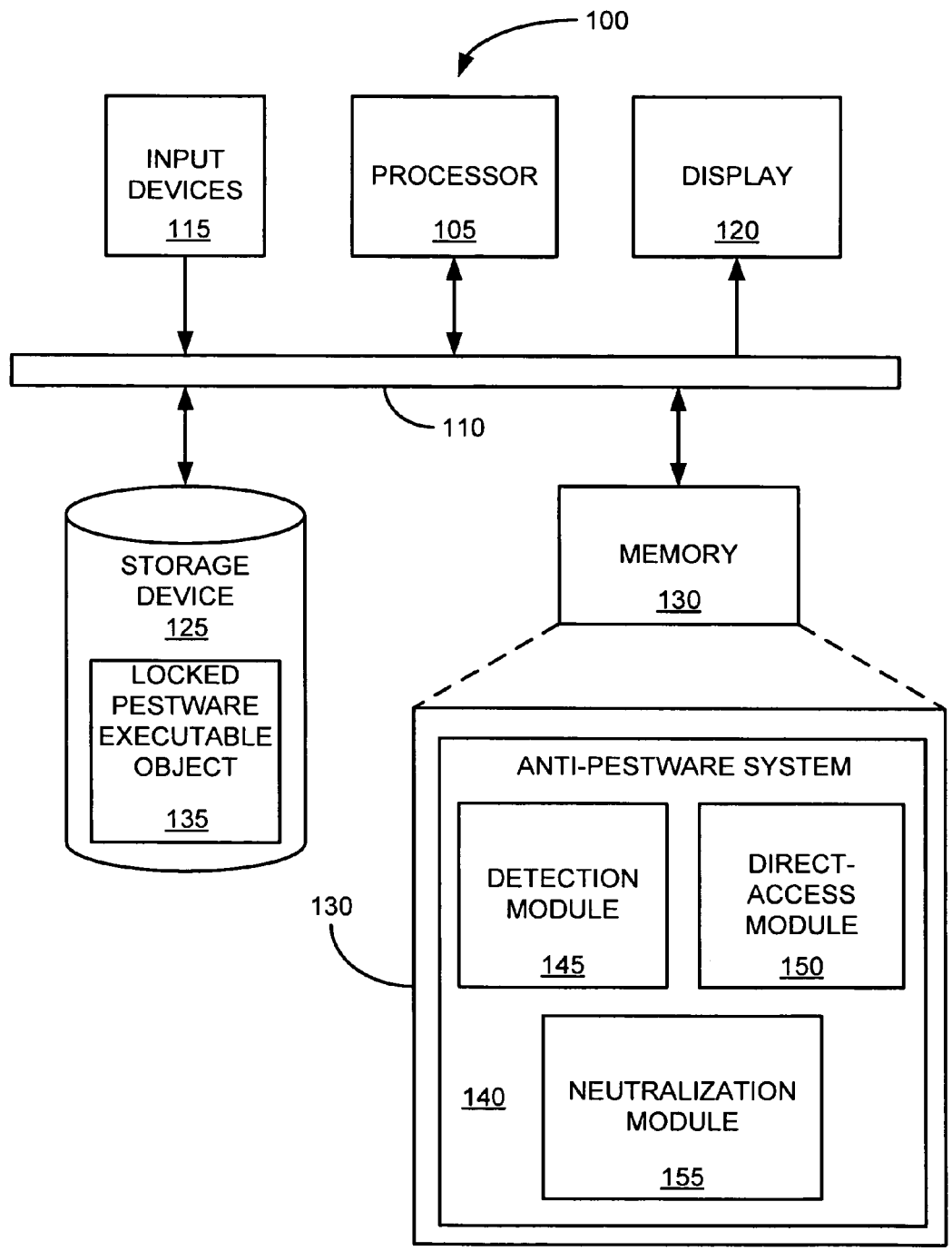
FIG. 1 is a functional block diagram of a computer protected by an anti-pestware system, in accordance with an illustrative embodiment of the invention.

"Pestware," as used herein, refers to any program that damages or disrupts a computer system or that collects or reports information about a person or an organization. Examples include, without limitation, viruses, worms, Trojan horses, spyware, adware, and downloaders. A computer file containing pestware executable program code that resides on a storage device of a computer and that is inaccessible via the computer's operating system is herein called a "locked pestware executable object." In this context, "inaccessible" means the locked pestware executable object cannot be read, modified (written to), or deleted. The inaccessibility of such a computer file can be due, for example, to a mechanism such as an exclusive-lock flag that is invoked by the pestware itself. Inaccessibility can also result if a pestware process associated with the computer file is running in the system's memory. For example, most operating systems will not allow an executable file to be deleted while its associated process is running.

Once detected, a locked pestware executable object can be rendered harmless to the computer by accessing it through direct drive access and modifying data in the locked pestware executable object. "Direct drive access," a term well known to those skilled in the computer programming art, means a method for accessing a computer storage device (a "drive") in which the standard file- and directory-level Application-Program-Interface (API) function calls of the operating system are bypassed. In direct drive access, the storage device is accessed at the sector (physical) level instead of at the file (logical) level. Direct drive access is also sometimes called "raw I/O." For example, operating systems sold by Microsoft Corporation under the trade name "Windows" (e.g., "Windows XP") provide a "CreateFile( )" direct-drive-access API.

In one illustrative embodiment, modifying data in the locked pestware executable object includes replacing an initial portion of the locked pestware executable object with program code that causes the locked pestware executable object to cease execution upon being launched. In this illustrative embodiment, the modified locked pestware executable object, though it can still be launched, simply exits shortly thereafter.

In another illustrative embodiment, modifying data in the locked pestware executable object includes rendering the locked pestware executable object invalid, to the operating system, as an executable object. In this illustrative embodiment, the operating system does not even attempt to execute the modified locked pestware executable object.

There are a variety of other ways of modifying data in the locked pestware executable object to render it harmless to the computer. The two illustrative embodiments just mentioned are merely examples of how that objective can be accomplished.

Once the locked pestware executable object has been rendered harmless, it can optionally be deleted from the storage device. In some cases, after the locked pestware executable object has been rendered harmless, the computer may need to be rebooted before the locked pestware executable object can be deleted from the storage device.

Referring now to the drawings, where like or similar elements are designated with identical reference numerals throughout the several views, FIG. 1 is a functional block diagram of a computer 100 protected by an anti-pestware system, in accordance with an illustrative embodiment of the invention. Computer 100 may be a desktop computer, workstation, laptop computer, notebook computer, handheld computer, or any other device that includes computing functionality. In FIG. 1, processor 105 communicates over data bus 110 with input devices 115, display 120, storage device 125, and memory 130.

Input devices 115 may be, for example, a keyboard and a mouse or other pointing device. In an illustrative embodiment, storage device 125 is a magnetic-disk device such as a hard disk drive (HDD). In other embodiments, however, storage device 125 can be any type of rewritable storage device, including, without limitation, a magnetic-disk drive, a rewritable optical disc drive, and a storage device employing flash-memory-based media such as secure digital (SD) cards or multi-media cards (MMCs). In FIG. 1, storage device 125 contains a locked pestware executable object 135, as defined above. Memory 130 may include random-access memory (RAM), read-only memory (ROM), or a combination thereof.

Anti-pestware system 140 protects computer 100 against pestware by detecting it and, where appropriate, removing it from computer 100. In the illustrative embodiment of FIG. 1, anti-pestware system 140 is an application program stored on a computer-readable storage medium of computer 100 (e.g., storage device 125) that can be loaded into memory 130 and executed by processor 105. In other embodiments, the functionality of anti-pestware system 140 can be implemented in software, firmware, hardware, or any combination thereof.

For convenience in this Detailed Description, the functionality of anti-pestware system 140 has been divided into three modules, detection module 145, direct-access module 150, and neutralization module 155. In various embodiments of the invention, the functionality of these three modules may be combined or subdivided in a variety of ways different from that shown in FIG. 1. Detection module 145 is configured to detect pestware on computer 100, including locked pestware executable object 135. Direct-access module 150 is configured to access locked pestware executable object 135 through direct drive access. Neutralization module 155 is configured to modify data in locked pestware executable object 135 in a manner that renders locked pestware executable object 135 harmless to the computer. The data in locked pestware executable object 135 can be modified in various ways to accomplish this objective, depending on the particular embodiment. Illustrative embodiments are described below in connection with FIGS. 2A-2B and FIGS. 3A-3B.

Despite locked pestware executable object 135 being inaccessible via the operating system of computer 100, detection module 145 can still detect locked pestware executable object 135. For example, in one illustrative embodiment, computer 100 runs an operating system sold by Microsoft under the trade name "Windows" (e.g., "Windows XP") which, in some versions, employs a New Technology File System (NTFS) for storage devices such as storage device 125.

NTFS treats all file-system components as files, and the Master File Table (MFT) is a special file that is much like a relational database table. The MFT contains a record (typically 1 KB long) for each file on the NTFS volume (folders are also treated as "files"). The MFT itself may be located by reading the first sector of the NTFS volume. This first sector of the volume specifies where the NTFS begins, the number of MFT records, and the size of each MFT record.

In the illustrative embodiment just mentioned in which computer 100 runs a Windows operating system, detection module 145 directly scans the MFT associated with storage device 125 to identify known pestware files. Directly scanning the MFT overcomes attempts by the pestware to hide itself from, e.g., the directory and registry of computer 100. In other embodiments, these same principles may be applied to other operating systems having file systems other than NTFS. In general, detection module 145 does not rely on directory information to detect pestware because pestware, in hiding itself, often tampers with such data. Rather, detection module 145 directly examines fundamental data structures associated with the file system (e.g., the MFT).

Once detection module 145 has detected the presence of locked pestware executable object 135 on storage device 125, neutralization module 155 may first attempt to deal with it in the normal fashion (e.g., by reading the pestware file's program code to confirm the identification, deleting it, etc.). When neutralization module 155 discovers that locked pestware executable object 135 is inaccessible via the operating system (i.e., that it is "locked"), it may invoke the help of direct-access module 150. Direct-access module 150 may use low-level routines such as "sector read" and "sector write" (direct drive access) to access files on storage device 125, bypassing the standard file API function calls of the operating system of computer 100. In particular, direct-access module 150 can, through direct drive access, access locked pestware executable object 135 despite its being locked. Additional details regarding how direct-access module 150 can locate and directly access locked pestware executable object 135 on storage device 125 are found in U.S. application Ser. No. 11/145,593, "System and Method for Neutralizing Locked Pestware Files."

Figure 2A:
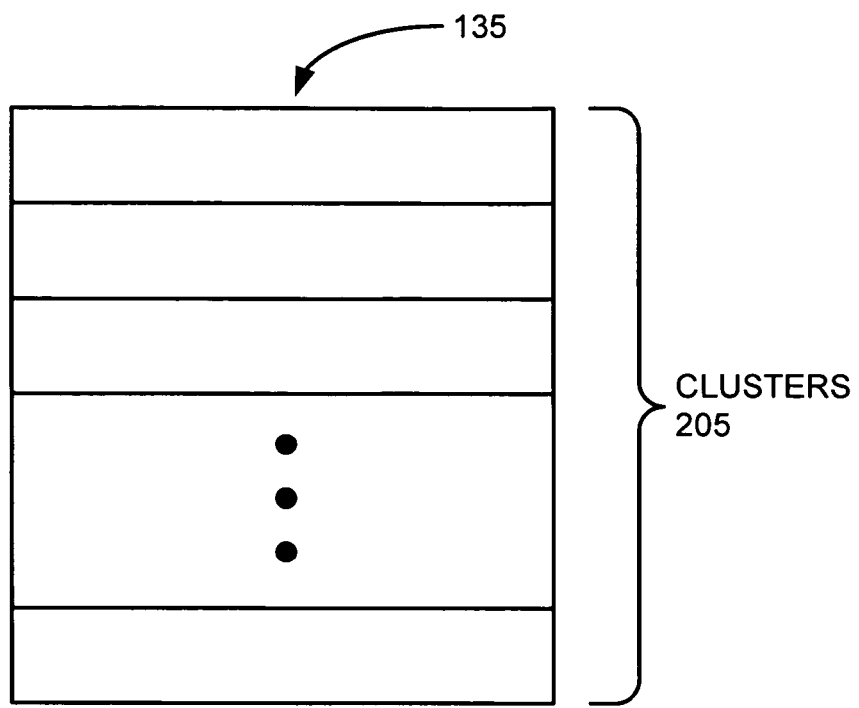
FIG. 2A is a diagram of a locked pestware executable object before its data has been modified to render it harmless to the computer, in accordance with an illustrative embodiment of the invention.

FIG. 2A is a diagram of locked pestware executable object 135 before neutralization module 155 has modified its data to render it harmless to computer 100, in accordance with an illustrative embodiment of the invention. As indicated in FIG. 2A, locked pestware executable object 135 occupies one or more clusters 205 on storage device 125. In practice, the clusters 205 making up locked pestware executable object 135 are not necessarily contiguous, as depicted in FIG. 2A. Instead, some or all of the clusters 205 might be separated (fragmented) on storage device 125.

Figure 2B:
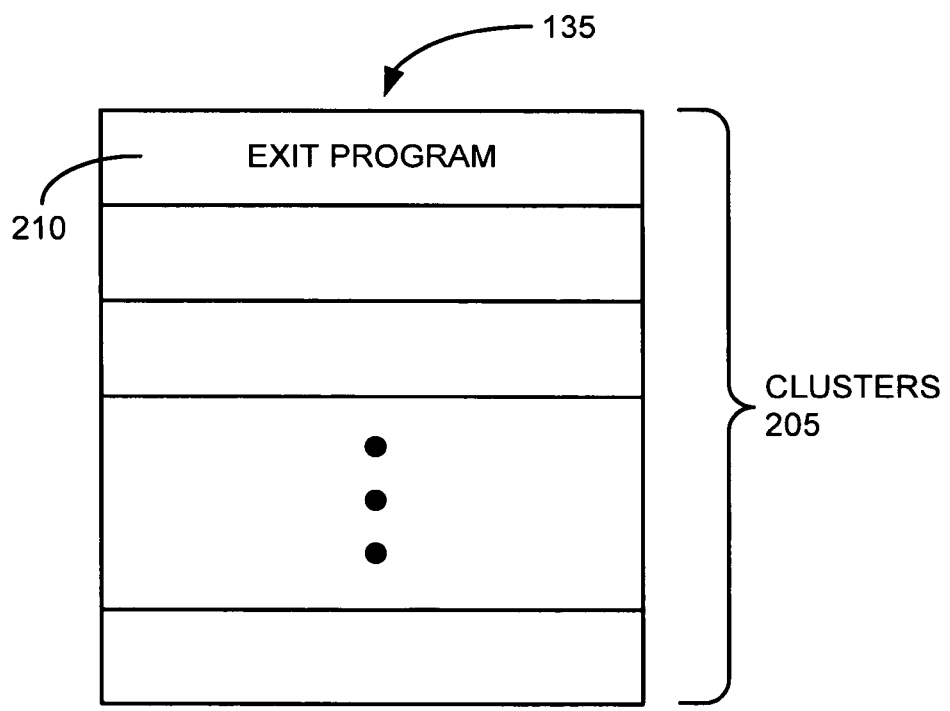
FIG. 2B is a diagram of a locked pestware executable object after its data has been modified to render it harmless to the computer, in accordance with an illustrative embodiment of the invention.

FIG. 2B is a diagram of locked pestware executable object 135 after neutralization module 155 has modified its data to render it harmless to computer 100, in accordance with an illustrative embodiment of the invention. In FIG. 2B, neutralization module 155 has, via direct-access module 150, replaced (overwritten) an initial portion of locked pestware executable object 135 with exit-program (termination) code 210 that causes a process associated with locked pestware executable object 135 to cease execution upon being launched. Exit-program code 210 may be termed a "termination stub." In the illustrative embodiment of FIG. 2B, the initial portion of locked pestware executable object 135 is its first cluster 205 on storage device 125. In other embodiments, the initial portion may include more than just the first cluster 205, but there is a greater risk, in that case, that the pestware will detect tampering with its code, possibly causing the pestware to reinstall itself.

Even though, after neutralization module 155 has installed exit-program code 210, a process associated with locked pestware executable object 135 might still be launched during a subsequent reboot of computer 100 (e.g., due to a registry entry on a Windows system), the associated process simply terminates shortly after being launched, rendering locked pestware executable object 135 harmless to computer 100. Once exit-program code 210 has been installed and computer 100 has been rebooted, locked pestware executable object 135 is no longer truly "locked," and neutralization module 155 can optionally be configured to delete locked pestware executable object 135 from computer 100 automatically or upon user confirmation.

Figure 3A:
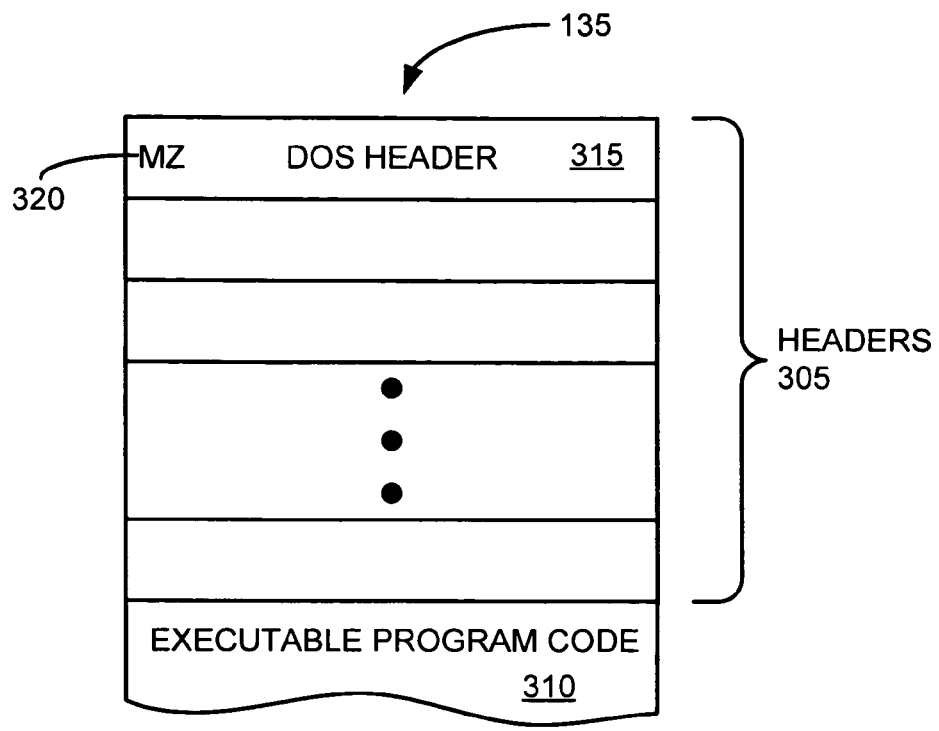
FIG. 3A is a diagram of a locked pestware executable object before its data has been modified to render it harmless to the computer, in accordance with another illustrative embodiment of the invention.
Figure 3B:
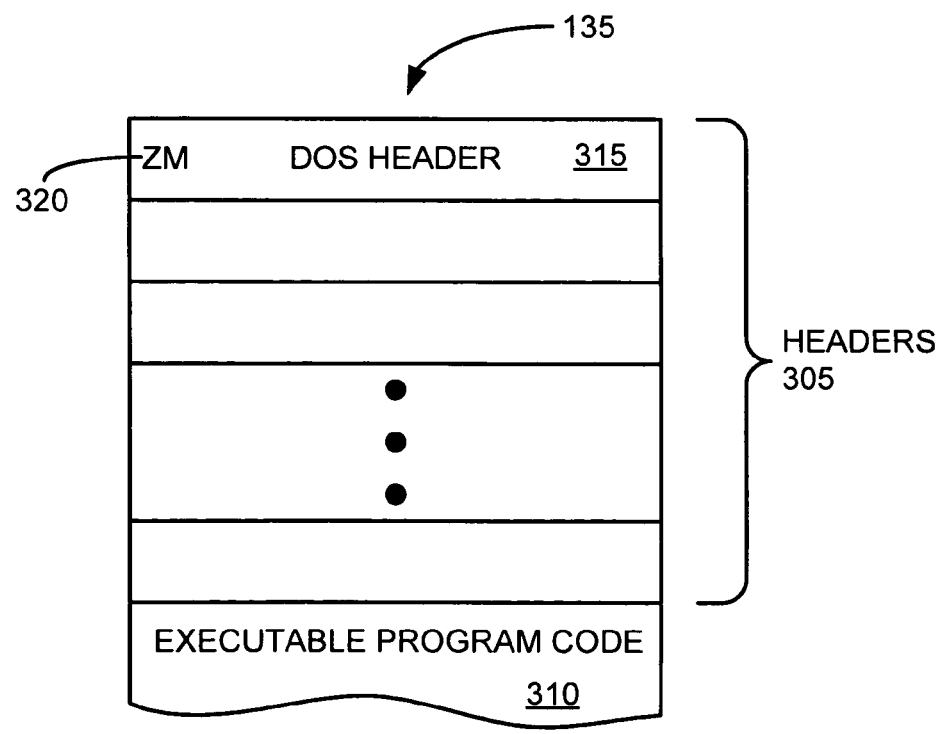
FIG. 3B is a diagram of a locked pestware executable object after its data has been modified to render it harmless to the computer, in accordance with another illustrative embodiment of the invention.

In another illustrative embodiment of the invention, neutralization module 155 renders locked pestware executable object 135 harmless to computer 100 by rendering it invalid, to the operating system of computer 100, as an executable object. Computer operating systems typically examine particular characteristics of a file to determine whether it is executable or not. For example, a file's extension may indicate whether it is executable. Headers or other metadata contained in the file itself may also indicate whether it is executable. Neutralization module 155 can be configured to modify data within locked pestware executable object 135 to make locked pestware executable object 135 appear, to the operating system, to be a non-executable file. Once data in locked pestware executable object 135 have been modified in that manner, the operating system will not even attempt to launch locked pestware executable object 135 upon a subsequent reboot of computer 100. After such a reboot, neutralization module 155 can optionally delete locked pestware executable object 135 from computer 100, either automatically or upon user confirmation. The implementation specifics of this embodiment may differ depending on the particular operating system running on computer 100. FIGS. 3A and 3B show one illustrative embodiment in which computer 100 runs a Windows operating system.

FIG. 3A is a diagram of locked pestware executable object 135 before neutralization module 155 has modified its data to render it harmless to computer 100, in accordance with an illustrative embodiment of the invention. In this illustrative embodiment, computer 100 runs a Windows operating system, and locked pestware executable object 135 may be in a format such as Microsoft's Portable Executable (PE) format or Common Object File Format (COFF). In FIGS. 3A and 3B, locked pestware executable object 135 is diagrammed differently than in FIGS. 2A and 2B. Rather than showing the division of locked pestware executable object 135 into clusters 205 on storage device 125, FIGS. 3A and 3B are diagrams of the logical, internal structure of locked pestware executable object 135 without regard to storage units such as clusters 205 on storage device 125. Locked pestware executable object 135 begins with a set of headers 305, which are followed by executable program code 310. The first header 305 is disk-operating-system (DOS) header 315. On a Windows system, the initial two bytes 320 of DOS header 315 in a valid executable file are "MZ." If initial two bytes 320 are any data other than "MZ," the Windows operating system will not attempt to execute the file, even if the file otherwise contains valid executable program code 310. Such a file is not viewed by the operating system as a valid executable object.

FIG. 3B is a diagram of locked pestware executable object 135 after neutralization module 155 has modified its data to render it harmless to computer 100, in accordance with an illustrative embodiment of the invention. In FIG. 3B, neutralization module 155, via direct-access module 150, has modified initial two bytes 320 of DOS header 315. Any modification from "MZ" is sufficient to render locked pestware executable object 135 invalid, to the operating system, as an executable object. In the particular example shown in FIG. 3B, neutralization module 155 has simply inverted the order of initial two bytes 320 (i.e., initial two bytes 320 are now "ZM"). In other embodiments, initial two bytes 320 may be modified in a wide variety of other ways.

Figure 4:
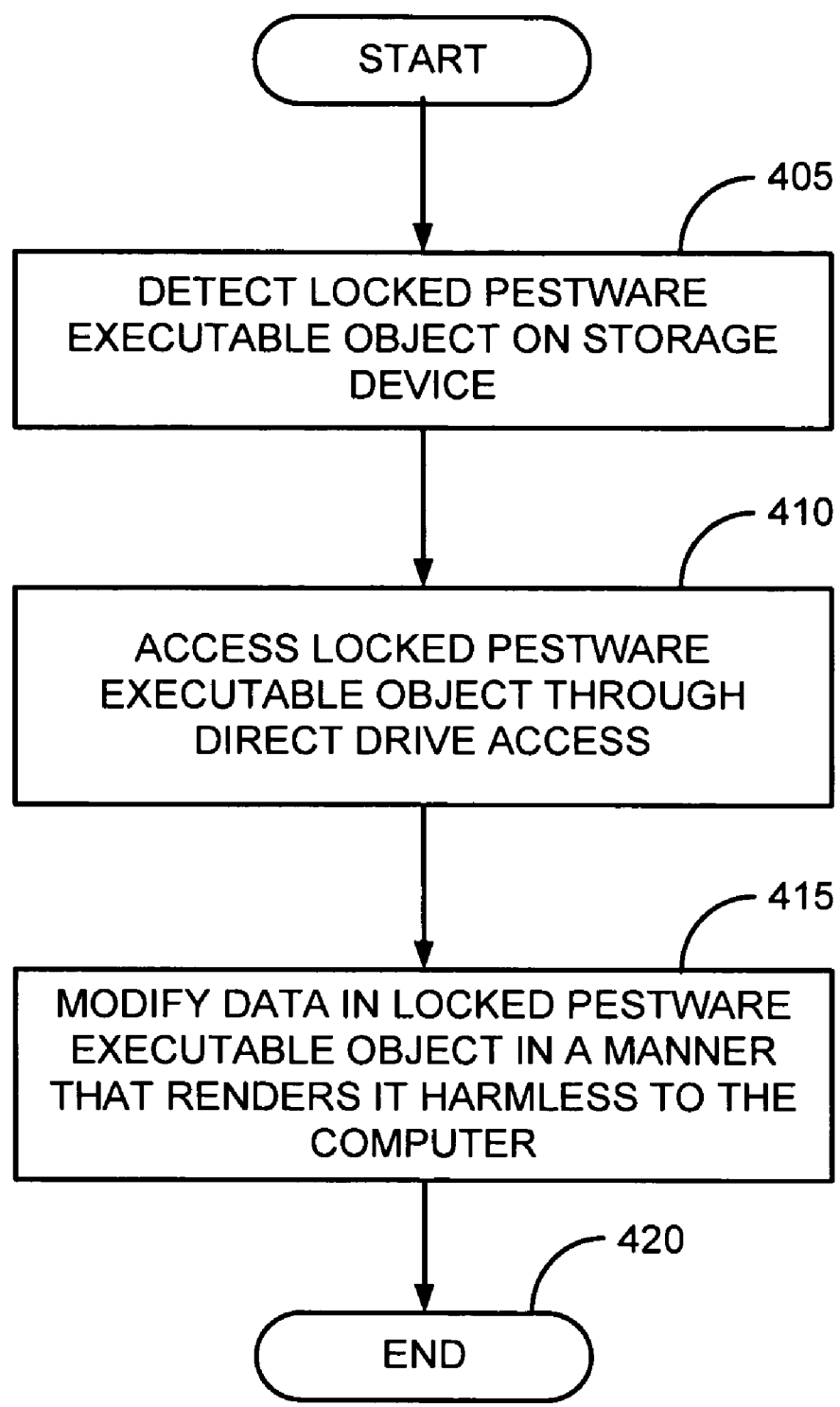
FIG. 4 is a flowchart of a method for rendering harmless a locked pestware executable object, in accordance with an illustrative embodiment of the invention.

FIG. 4 is a flowchart of a method for rendering harmless a locked pestware executable object 135, in accordance with an illustrative embodiment of the invention. At 405, detection module 145 detects the presence of locked pestware executable object 135 on storage device 125. At 410, direct-access module 150 accesses locked pestware executable object 135 through direct drive access. At 415, neutralization module 155, via direct-access module 150, modifies data in locked pestware executable object 135 in a manner that renders locked pestware executable object 135 harmless to computer 100. The process terminates at 420.

Figure 5:
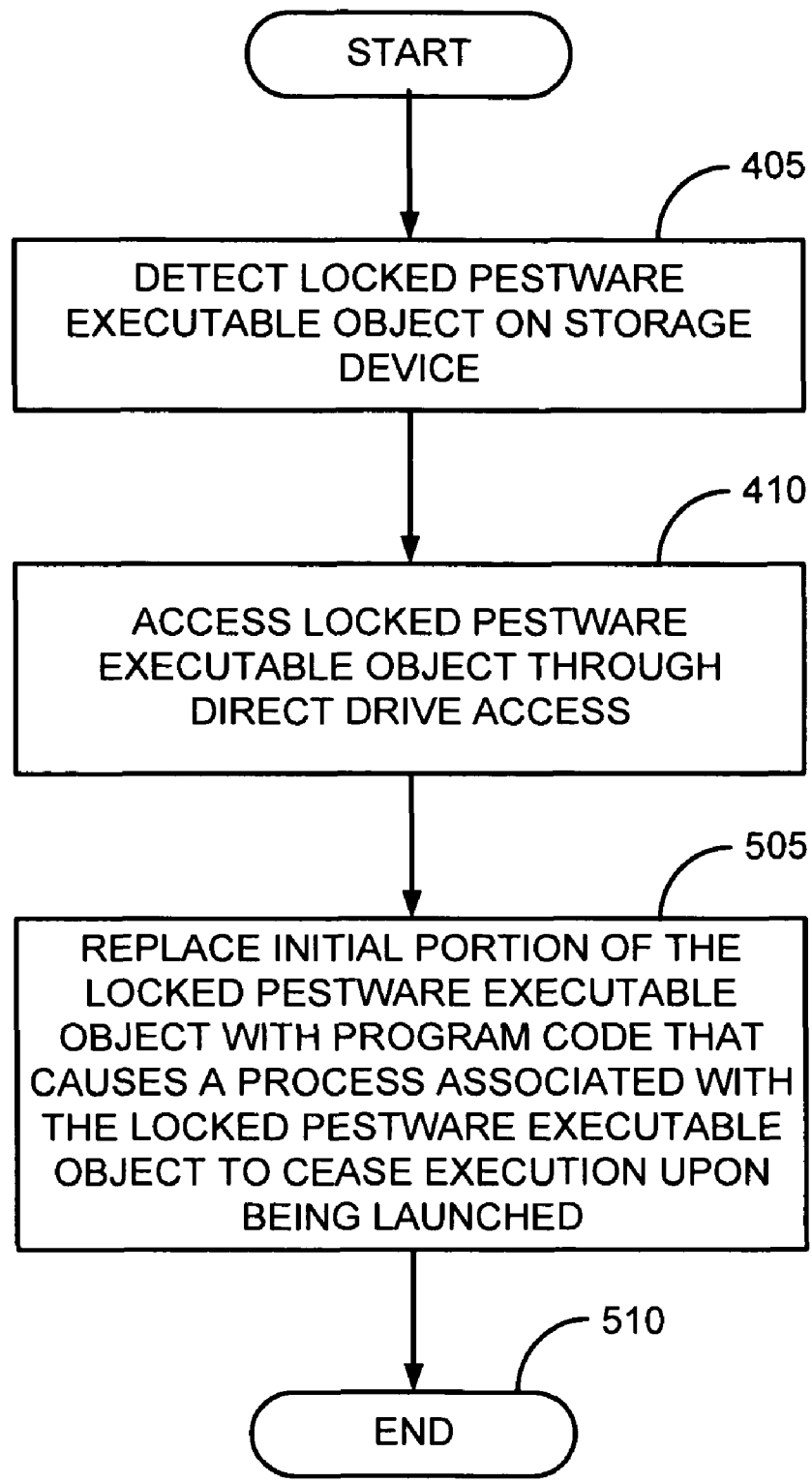
FIG. 5 is a flowchart of a method for rendering harmless a locked pestware executable object, in accordance with another illustrative embodiment of the invention.

FIG. 5 is a flowchart of a method for rendering harmless a locked pestware executable object, in accordance with another illustrative embodiment of the invention. The flowchart of FIG. 5 corresponds to the illustrative embodiment discussed in connection with FIGS. 2A and 2B. After completing steps 405 and 410 in FIG. 4, neutralization module 155, via direct-access module 150 at 505, replaces an initial portion of locked pestware executable object 135 with exit-program code 210 that causes a process associated with locked pestware executable object 135 to cease execution upon being launched. At 510, the process terminates.

Figure 6:
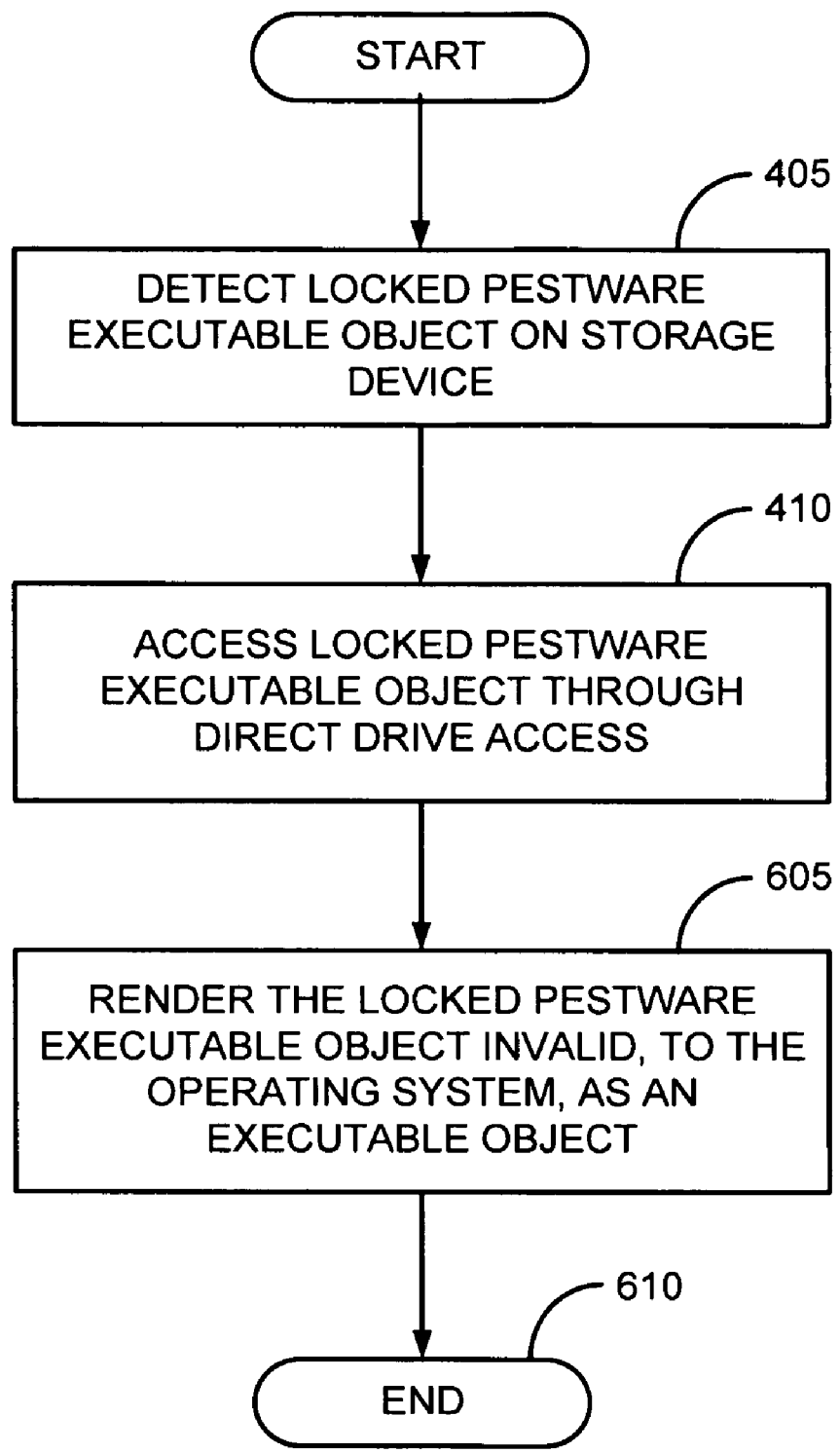
FIG. 6 is a flowchart of a method for rendering harmless a locked pestware executable object, in accordance with yet another illustrative embodiment of the invention.

FIG. 6 is a flowchart of a method for rendering harmless a locked pestware executable object, in accordance with yet another illustrative embodiment of the invention. After completing steps 405 and 410 in FIG. 4, neutralization module 155, via direct-access module 150 at 605, renders locked pestware executable object 135 invalid, to the operating system of computer 100, as an executable object. An example of how neutralization module 155 can do this for a specific family of operating systems (Microsoft Windows) is discussed above in connection with FIGS. 3A and 3B. The process terminates at 610.

Figure 7:
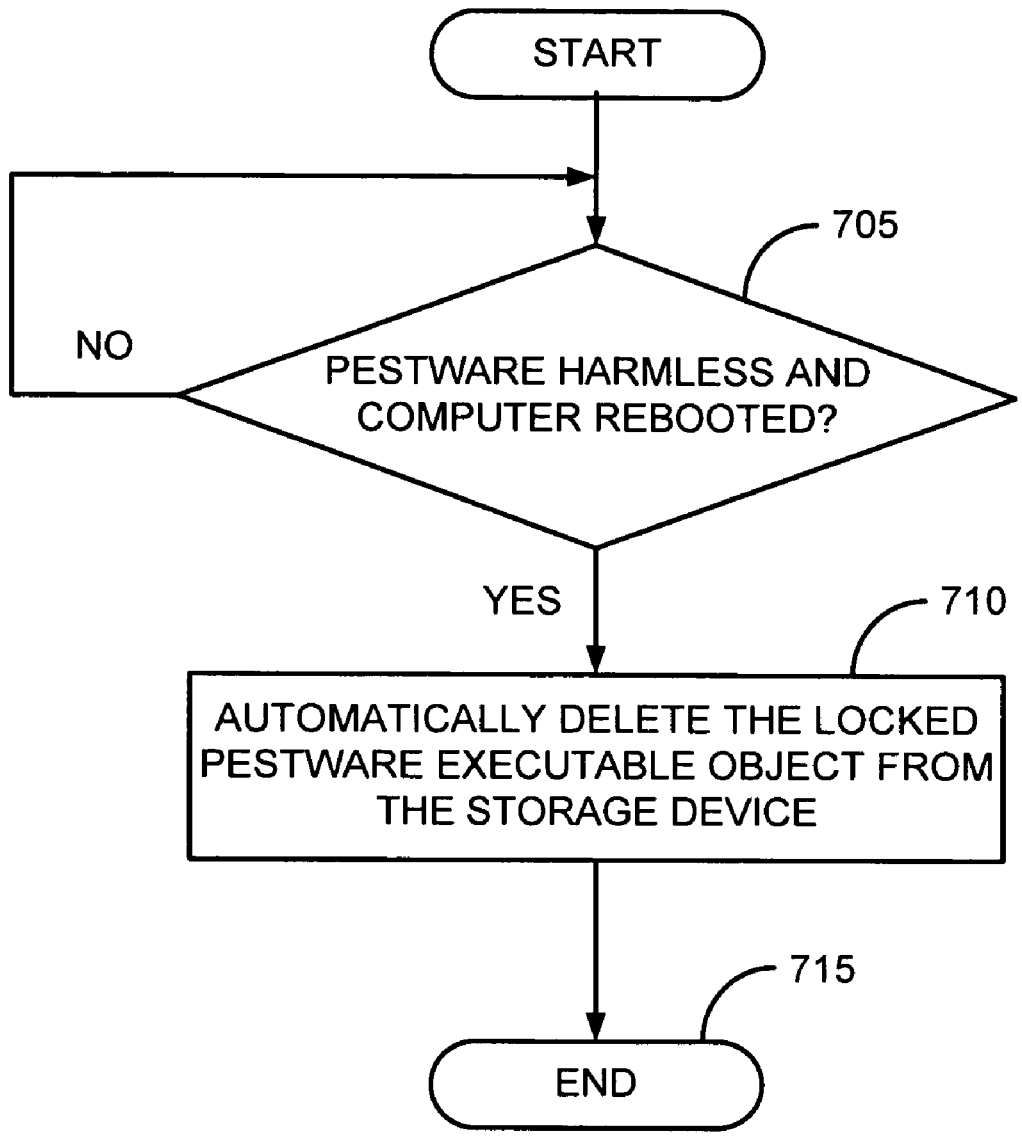
FIG. 7 is a flowchart of a method for deleting a locked pestware executable object after it has been rendered harmless, in accordance with an illustrative embodiment of the invention.

FIG. 7 is a flowchart of a method for deleting a locked pestware executable object 135 after it has been rendered harmless, in accordance with an illustrative embodiment of the invention. If, at 705, neutralization module 155 has modified data in locked pestware executable object 135 in a manner that renders it harmless to computer 100 and computer 100 has been rebooted (restarted), neutralization module 155 can proceed, at 710, to delete locked pestware executable object 135 from storage device 125. At this point, locked pestware executable object 135 is not truly "locked" any longer and may be deleted automatically or upon user confirmation.

In conclusion, the present invention provides, among other things, a method and system for rendering harmless a locked pestware executable object. Those skilled in the art can readily recognize that numerous variations and substitutions may be made in the invention, its use and its configuration to achieve substantially the same results as achieved by the embodiments described herein. Accordingly, there is no intention to limit the invention to the disclosed illustrative forms. Many variations, modifications and alternative constructions fall within the scope and spirit of the disclosed invention as expressed in the claims. For example, though some of the above embodiments are described in the context of a Windows operating system, the principles of the invention can be applied to other operating systems, including open-source operating systems such as Linux.

What is claimed is:

1. A method, comprising:
   detecting a locked pestware executable object on a storage device of a computer, the locked pestware executable object being inaccessible via an operating system of the computer;
   accessing the locked pestware executable object through direct drive access, the direct drive access bypassing standard file Application-Program-Interface (API) function calls of the operating system;
   modifying data in the locked pestware executable object in a manner that renders it harmless to the computer, wherein modifying includes rendering the locked pestware executable object invalid, to the operating system, as an executable object, wherein rendering the locked pestware executable object invalid includes inverting the order of two initial bytes of a DOS header of the locked pestware executable object; and
   deleting the locked pestware executable object from the storage device automatically, after data in the locked pestware executable object has been modified and the computer has been rebooted.

2. The method of claim 1, wherein modifying includes replacing an initial portion of the locked pestware executable object with program code that causes a process associated with the locked pestware executable object to cease execution upon being launched.

3. A system, comprising:
   a computer comprising a processor unit and memory, the computer being configured to execute a plurality of software modules, including;
   a detection module configured to detect a locked pestware executable object on a storage device of a computer, the locked pestware executable object being inaccessible via an operating system of the computer, the detection module being hosted by the computer;
   a direct-access module configured to access the locked pestware executable object through direct drive access, the direct drive access bypassing standard file Application-Program-Interface (API) function calls of the operating system, the direct-access module being hosted by the computer; and
   a neutralization module configured to modify data in the locked pestware executable object in a manner that renders the locked pestware executable object harmless to the computer, the neutralization module being hosted by the computer, wherein the neutralization module is configured to render the locked pestware executable object invalid, to the operating system, as an executable object including inverting the order of two initial bytes of a DOS header of the locked pestware executable object, the neutralization module being further configured to delete the locked pestware executable object from the storage device automatically, after the neutralization module has modified data in the locked pestware executable object and the computer has been rebooted.

4. The system of claim 3, wherein the neutralization module is configured to replace an initial portion of the locked pestware executable object with program code that causes a process associated with the locked pestware executable object to cease execution upon being launched.

5. A system, comprising:
   A computer comprising a processor unit and memory;
   means for detecting a locked pestware executable object on a storage device of a computer, the locked pestware executable object being inaccessible via an operating system of the computer;

means for direct drive access to access the locked pestware executable object;

means for modifying data in the locked pestware executable object in a manner that renders the locked pestware executable object harmless to the computer, wherein the means for modifying is configured to render the locked pestware executable object invalid, to the operating system, as an executable object including inverting the order of two initial bytes of a DOS header of the locked pestware executable object; and means for deleting the locked pestware executable object from the storage device automatically, after the means for modifying has modified data in the locked pestware executable object and the computer has been rebooted.

6. The system of claim 5, wherein the means for modifying is configured to replace an initial portion of the locked pestware executable object with program code that causes a process associated with the locked pestware executable object to cease execution upon being launched.

7. A non-transitory computer-readable storage medium containing program instructions, comprising:

a first instruction segment configured to detect a locked pestware executable object on a storage medium of a computer, the locked pestware executable object being inaccessible via an operating system of the computer;

a second instruction segment configured to access the locked pestware executable object through direct drive access, the direct drive access bypassing standard file Application-Program-Interface (API) function calls of the operating system; and a third instruction segment configured to modify data in the locked pestware executable object in a manner that renders the locked pestware executable object harmless to the computer, wherein the third instruction segment is configured to render the locked pestware executable object invalid, to the operating system, as an executable object including inverting the order of two initial bytes of a DOS header of the locked pestware executable object, the third instruction segment being further configured to delete the locked pestware executable object from the storage device automatically, after the third instruction segment has modified data in the locked pestware executable object and the computer had been rebooted.

8. The non-transitory computer-readable storage medium of claim 7, wherein the third instruction segment is configured to replace an initial portion of the locked pestware executable object with program code that causes a process associated with the locked pestware executable object to cease execution upon being launched.

* * * * *